United States Patent [19]

Skurka

[11] Patent Number: 4,643,279

[45] Date of Patent: Feb. 17, 1987

[54] MEANS FOR CONNECTING A BRAKE ROD TO THE LEVER ARM OF AN AUTOMATIC SLACK ADJUSTER

[75] Inventor: James A. Skurka, Niles, Ill.

[73] Assignee: Sloan Valve Company, Franklin Park, Ill.

[21] Appl. No.: 730,733

[22] Filed: May 6, 1985

[51] Int. Cl.⁴ .................. F16D 65/46; B60T 11/00
[52] U.S. Cl. .................. 188/79.5 K; 403/378; 403/299; 411/142
[58] Field of Search .......... 188/79.5 GE, 79.5 K; 403/378, 379, 320, 157, 318, 118, 287, 299; 411/132, 134, 135, 140, 142; 285/305

[56] References Cited

U.S. PATENT DOCUMENTS

| | | | |
|---|---|---|---|
| 951,078 | 3/1910 | Keegan | 411/142 |
| 2,869,386 | 1/1959 | Hoover | 403/318 |
| 3,295,579 | 1/1967 | Medal | 411/140 |
| 4,015,692 | 4/1977 | Mathews | 188/79.5 K |
| 4,146,115 | 3/1979 | Tazelaar | 188/79.5 K |
| 4,580,665 | 4/1986 | Saxton et al. | 188/79.5 K |

Primary Examiner—Duane A. Reger
Assistant Examiner—James E. Barlow
Attorney, Agent, or Firm—Kinzer, Plyer, Dorn & McEachran

[57] ABSTRACT

A slack adjuster for vehicle brakes is adapted to be mounted between the vehicle brake chamber and the vehicle brake operating shaft and includes a body which positions a drive member movable relative thereto on the brake operating shaft. A lever arm is pivoted to the body and there is an adjustable connection between the lever arm and the drive member for adjusting the relationship between the drive member and the body in response to body movement required for a brake application. The improvement herein is specifically directed to a device for connecting a brake rod to the lever arm and more specifically to a bushing threaded upon the brake rod and rotatably positioned within the lever.

1 Claim, 5 Drawing Figures

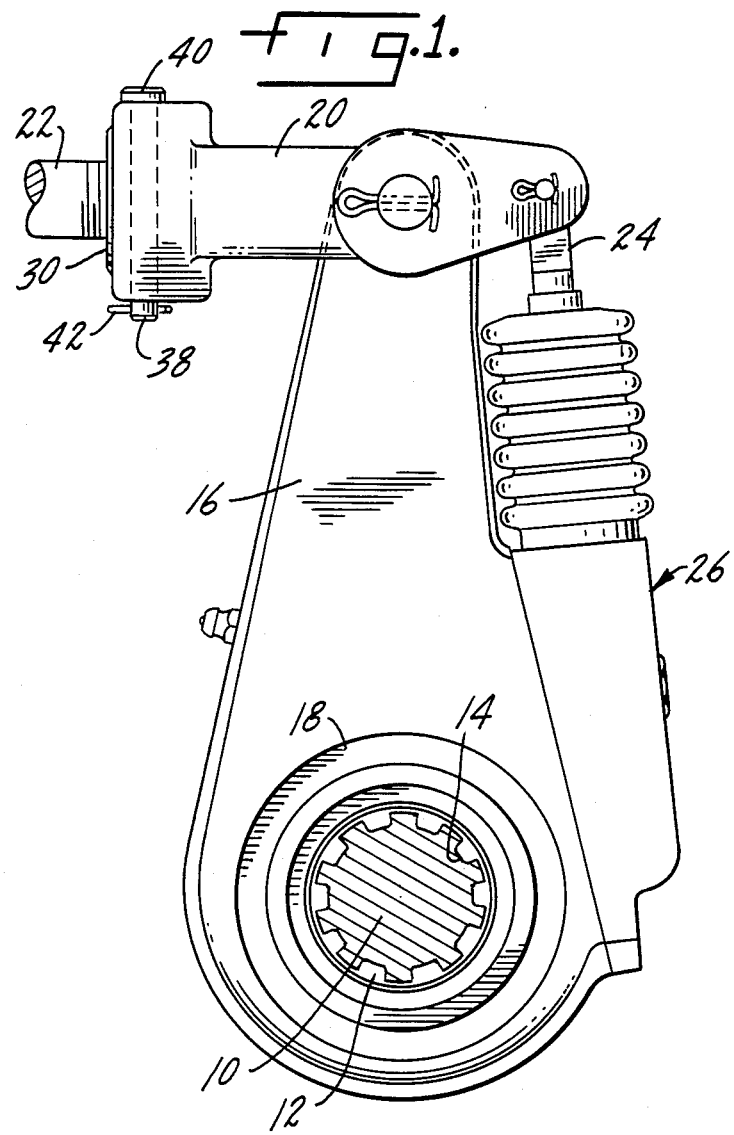
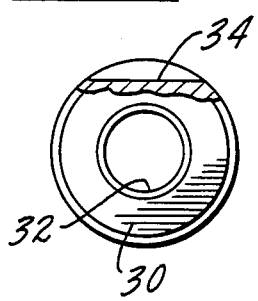
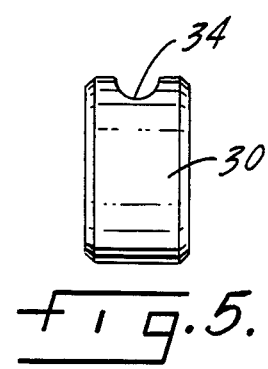
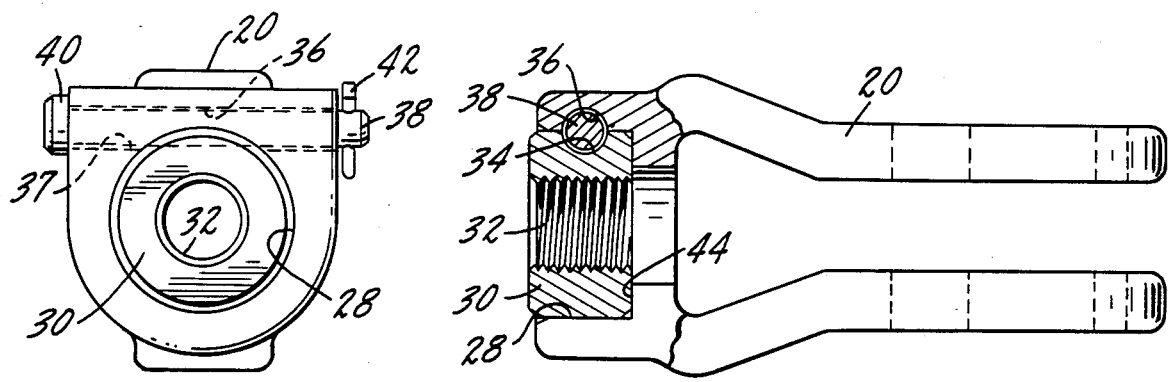

MEANS FOR CONNECTING A BRAKE ROD TO THE LEVER ARM OF AN AUTOMATIC SLACK ADJUSTER

SUMMARY OF THE INVENTION

The present invention relates to slack adjusters for use in over-the-road vehicles such as trucks or the like and has particular relation to such a slack adjuster and the means for connecting the lever arm or yoke of the slack adjuster to the brake rod.

A primary purpose of the invention is a simply constructed, reliably operable connection of the type described.

Another purpose is a connection for the lever arm or yoke of a vehicle slack adjuster utilizing a threaded bushing and a locking member which can hold the bushing in position within the lever arm, once the bushing has been properly positioned.

Other purposes will appear in the ensuing specification, drawings and claims.

BRIEF DESCRIPTION OF THE DRAWINGS

The invention is illustrated diagramatically in the following drawings wherein:

FIG. 1 is a side elevation of a slack adjuster of the type described,

FIG. 2 is an end view of the slack adjuster lever arm with the bushing therein,

FIG. 3 is a side view, in part section, of the slack adjuster lever arm or yoke, FIG. 4 is an end view of the bushing, in part section, and FIG. 5 is a side view of the bushing.

DESCRIPTION OF THE PREFERRED EMBODIMENT

The present invention relates to slack adjusters, both manual and automatic, of the type in use today on over-the-road vehicles such as trucks or the like. Such an automatic slack adjuster is illustrated in copending application Ser. No. 555,647, assigned to the assignee of the present application.

The present invention is particularly concerned with the connection between the lever arm of the slack adjuster and the brake rod. In prior such connections, in order to adjust the position of the lever arm or yoke, as it is called in the trade, on the brake rod, it is necessary to remove the pin connection between the yoke and the slack adjuster body, after which the yoke may be rotated on the brake rod. The present invention provides a subassembly for connection in which a bushing is threaded upon the brake rod and the bushing is then positioned within a bore in the yoke. A locking member is inserted once the bushing has been correctly adjusted relative to the yoke and the brake rod, thereby preventing further movement relative thereto and locking the assembly together. The pin or locking member may be easily removed if further adjustments are required.

In the drawings, a shaft is indicated at 10 and is the brake operating shaft of a conventional over-the-road vehicle brake system. The shaft 10 may be what is known in the trade as an S cam shaft in reference to the manner in which the shaft brings about operation of the brakes. A drive member or worm gear 12 having a plurality of inwardly-directed splines 14 is connected to shaft 10 with gear 12 being rotatably mounted within a body indicated generally at 16. A side cover plate 18 is mounted to the body and a seal may be inserted where required to protect the body interior.

The opposite end of body 16 pivotally mounts a yoke or lever arm 20 which is journaled to the body and will be connected to a brake rod 22. The yoke is pivotally connected to a link 24 which forms a part of a slack adjustment apparatus indicated generally at 26. The type of slack adjustment apparatus may vary from that shown in the above-mentioned copending application to other such constructions for the same purpose. The present invention is not concerned with the particular apparatus used to make slack adjustment or whether the adjustment is automatic or manual.

Referring specifically to the yoke 20 as illustrated in FIG. 3, there is a bore or cylindrical chamber 28 formed therein and a bushing 30 is positioned within the chamber. The bushing has an interior threaded surface 32 which will receive the threaded end of brake rod 22, thus providing a connection between the brake rod and the yoke. The bushing has a cylindrical exterior surface with a tangential groove 34 formed therein, which groove is positioned opposite, in the illustration of FIG. 3, to a mating groove 36 formed through the interior surface of bore 28. Groove 36 is a part of a transverse opening or hole 37 which receives a pin 38.

The combination of groove 34 in the exterior surface of bushing 30 and hole 37 provides a clear opening to receive pin 38 when the bushing is positioned within the chamber and the grooves are aligned. Pin 38 is used as a locking member to fasten the bushing within bore 28. Prior to the time that the pin is inserted, the bushing may be rotated upon the threaded end of rod 22 to connect and properly adjust the position of the rod and the yoke. Once the connection is made, the grooves of the bushing and the yoke are aligned and pin 38 is inserted.

Pin 38 may have a head 40 which will bear against one side of the yoke when the pin is inserted and a cotter pin or the like 42 may be used to fasten the pin to the yoke.

Bore 28 has a supporting shoulder 44, illustrated in FIG. 3, at the inner end to provide support for bushing 30 in what is called the high pressure direction. Thus, the shoulder prevents the bushing from being driven through the yoke when pressure is applied during a brake application. Pin 38 resists removal of the bushing from the yoke in the low pressure direction. The pin takes the load in the low pressure direction and shoulder 44 prevents the bushing from being pushed through the yoke in the high pressure direction.

The particular means for locking the bushing within the yoke may vary. In the arrangement shown, the bushing exterior is cylindrical and the pin extends through a groove in the exterior of the bushing. In another embodiment, the exterior of the bushing may be non-cylindrical, e.g. rectangular, hexagonal, etc. In such an arrangement, the exterior of the bushing does not require a groove as the pin may extend through the yoke and be flush against a flatted surface of the bushing which will prevent the bushing from being rotated once the pin is inserted.

The present invention provides a means for quick assembly of the slack adjuster to brake rod 22. Not only does it provide for quick assembly, but adjustment of the relative position of these two elements only requires removal of the pin, rotation of the bushing and then re-insertion of the locking pin.

Whereas the preferred form of the invention has been shown and described herein, it should be realized that there may be many modifications, substitutions and alterations thereto.

The embodiments of the invention in which an exclusive property or privilege is claimed are defined as follows:

1. In a slack adjuster for vehicle brakes adapted to be mounted between the brake chamber and the brake operating shaft, a body, a drive member movable relative to and positioned by said body on the brake operating shaft, a lever arm pivoted to said body, an adjustable connection between said lever arm and drive member for adjusting the relationship between said drive member and body, the improvement comprising means for connecting a brake rod to said lever arm including a generally cylindrical bore in said lever arm, a bushing having a generally cylindrical exterior surface rotatably mounted upon the brake rod and rotatably positioned within the lever arm bore, mating chordal grooves on the exterior of said bushing and in said bore, an opening extending through said lever arm and coextensive with said bore groove, a pin extending from the exterior of said lever arm, through said opening and positioned within said mating grooves to prevent rotation of said bushing relative to said lever arm when inserted therein, said pin having an enlarged head at one end which contacts the exterior of said lever arm and a fastener extending through the other end of said pin to hold said pin within said opening and thereby prevent rotation of said bushing within said lever arm bore, a reinforcing shoulder at one end of said bore for supporting said bushing, with said pin preventing pullout of said bushing from said lever arm in one direction, and said shoulder supporting said bushing in the lever arm against removal in the opposite direction.

* * * * *